United States Patent Office 3,238,036
Patented Mar. 1, 1966

3,238,036
METHOD OF INHIBITING PLANT GROWTH WITH CYCLOHEXENYL CARBAMATES
Richard A. Herrett, Raleigh, N.C., assignor to Union Carbide Corporation, a corporation of New York
No Drawing. Filed Apr. 2, 1963, Ser. No. 269,895
6 Claims. (Cl. 71—2.6)

This invention relates to novel methods of regulating the growth of plants and is particularly concerned with controlling the growth of undesired weeds.

A wide variety of phytotoxic responses can be induced in plants by application of the operative materials disclosed herein and, by varying the applied concentrations of my materials, stimulation of plant growth can also be induced. Thus, in one aspect of this invention, indiscriminate killing of weeds such as crabgrass, barnyard grass, ryegrass, mustard, redroot, yellow foxtail, and wild oats is achieved; in other aspects desiccation of such plants as cotton and beans is effected and extraneous sucker growth on tobacco plants is controlled. At lower concentrations the chemicals used herein are employed to promote the germination of seeds, or to stimulate the root formation of cuttings, etc.

The novel methods of this invention comprise the application to the vegetation to be affected of a cyclohexenyl N-methylcarbamate wherein the cyclic moiety is linked to the ether oxygen of the carbamate group via a divalent hydrocarbon, e.g. alkylene, alkenylene, linkage. The operative compounds thus generally responds to the formula:

(I) 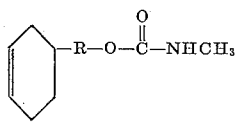—R—O—C(=O)—NHCH$_3$ wherein R is a divalent organic linkage composed exclusively of carbon and hydrogen and containing from 1 to about 5 carbon atoms. Illustrative of typical "R" linkages are alkylene, such as methylene, ethylene, etc., alkenylene, such as alpha-allylene, and alkylene and alkenylene carrying alkyl, alkenyl, alkynyl branches.

My toxicants may be applied conveniently in the form of a spray containing the active ingredient in a concentration within the range of 0.01–20.0% by weight, preferably from 1–10% by weight. Thorough coverage of the foliage is effective for contact killing. For pre-emergence control of plants amounts within the range of ¼ to 100 pounds per acre may be used.

Although most of the esters are insoluble in water, they are soluble in common organic solvents. Most of them are soluble in acetone, chloroform, ethyl alcohol, ethyl acetate, benzene, ether and heptane. The esters may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or tall oil or higher mercaptans and other dispersing and wetting agents. Formulation of dry compositions is accomplished by mixing with finely divided solid carriers. Suitable carriers comprise talc, clay, pyrophyllite, silica and fullers earth. Usually the toxicant will be only a minor proportion. The dry formulation may be used as a dust or dispersed in aqueous medium before application; if the latter it is convenient to incorporate a wetting or dispersing aid into the formulation.

Both the solid and the liquid formulations above described are useful in the application of herbicides because they facilitate the uniform distribution and aid in the destruction of undesirable plants by maintaining the active ingredient in a form which enables prompt assimilation by the plant and efficient utilization of its weed destroying properties. The described conditioning agents enable the proper use by an unskilled operator without elaborate equipment to achieve the desired herbicidal effects.

The compounds used in my invention are readily prepared by conventional techniques. One synthesis involves reacting a suitable alcohol (II) 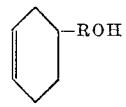—ROH wherein R is defined as before, with methyl isocyanate, to give the desired N-methylcarbamate.

The methyl isocyanate addition can be carried out, generally, by contacting the alcohol with methyl isocyanate in an inert organic solvent, and preferably in the presence of a tertiary amine or organotin catalyst. The reaction may be effected at temperatures ranging from about 0° C. to about 100° C., and is preferably carried out between room temperature and about 80° C. Generally, temperatures in excess of about 100° C. are to be avoided in view of competing side reactions. The operating pressure may range from about 1 atmosphere to about 10 atmospheres, preferably from about 2 to about 3 atmospheres, and is dependent upon the concentration and vapor pressure of the volatile isocyanate at the reaction temperature. The inert organic solvents that can be employed in the reaction are those inert to isocyanates in general, i.e. those free of radicals such as hydroxy or amino radicals. Illustrative solvents are aliphatic and aromatic hydrocarbons, such as hexane, heptane, octane, benzene, toluene, and the like, and ethers such as diethyl ether, ethyl propyl ether, and the like. The reaction is preferably carried out in the presence of a tertiary amine, e.g. triethylene diamine, or organotin catalyst. The term "organotin catalyst" as used herein is meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally amounts of said catalyst from about 0.1 to about 100 weight percent of the starting material comprised of methyl isocyanate and the benzyl alcohol are sufficient. The mol ratio of methyl isocyanate to alcohol can range from 0.25:1 to about 2:1, but preferably an equimolar amount or slight excess of methyl isocyanate is employed to insure that the alcohol is completely reacted. The reaction time may vary from about 5 minutes to about 7 days, but normally, when operating in the preferred temperature range, reaction times of from about one-half hour to about five hours are sufficient for complete reaction.

The carbamate product formed, either a solid or oily liquid, can be recovered from the reaction mixture by means known to the art, e.g. by vacuum-distillation to drive off solvent and excess isocyanate.

An alternative procedure involves a two-step synthesis in which the alcohol (II) is reacted with phosgene to form the corresponding chloroformate which, in turn, is reacted with methylamine to give the desired compound as follows:

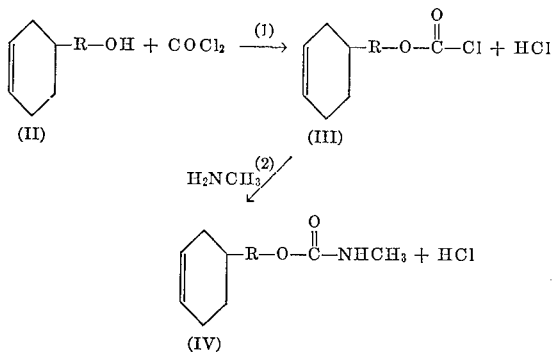

The chloroformate (III) is prepared by adding the alcohol (II) dissolved in an inert solvent, such as hydrocarbon or ether, to a solution of phosgene, dissolved in the same solvent, at a temperature of 0 to 10° C. After allowing the reaction to come to completion by stirring for a period of 0.5 to 4 hours, the excess phosgene is removed under vacuum and the chloroformate stripped free of solvent and distilled. Alternatively, the chloroformate is used in the production of the carbamate as a residue product still contained in the reaction solvent.

The chloroformate is added to a 100 percent excess of the desired amine contained in a solvent of the type used in the preparation of the chloroformate. The amine is used in excess to remove the hydrogen chloride evolved during the reaction which is conducted below 30° C. After allowing the reaction to come to completion, which usually requires from 0.5 to 2 hours, the mixture is diluted with water, the layers are separated and the organic layer is washed with water and then dried over a suitable desiccant such as anhydrous sodium sulfate. The dried organic layer is distilled to remove the solvent and the resulting product carbamate, while usually sufficiently pure to be used as a residue product, may be further purified by vacuum distillation or recrystallization from a suitable solvent.

The starting alcohols (II) are well-known and can be prepared by reducing the corresponding 1,2,3,6-tetrahydrobenzaldehyde (prepared by a Diels-Alder reaction of, e.g. butadiene with acrolein) with aluminum isopropoxide or, alternatively, by hydrolyzing the corresponding cyclohexenylmethyl chloride.

The following examples are illustrative.

EXAMPLE I

3 - cyclohexenylmethyl N - methylcarbamate was produced as follows:

To a solution of 190 grams of 3-cyclohexenyl methanol dissolved in 275 milliliters of anhydrous diethyl ether was added dropwise and with stirring 190 grams of methyl isocyanate. After the addition was completed the reaction flask was stoppered and the reaction mixture was allowed to stand at room temperature for 48 hours. The ether and excess methyl isocyanate were evaporated under reduced pressure and the residual oil distilled through an eight-inch Vigreux column to obtain a colorless oily distillate product, boiling point 87.5–89° C. at 0.4 mm. Hg, which solidified upon cooling. The yield was 91 percent of the theoretical and analysis showed nitrogen found= 8.07 percent (calculated=8.28 percent).

EXAMPLE II 1-(3-cyclohexenyl)propynyl N-methylcarbamate was prepared in the following manner:

A mixture of 25 grams of 3-cyclohexenylpropargyl alcohol, 25 grams of methyl isocyanate, and 40 milliliters of anhydrous diethyl ether was allowed to stand in a pressure bottle at room temperature for 48 hours. The ether and excess methyl isocyanate were then removed from the reaction mixture by distillation and the residual oil was distilled through a short, unpacked column to yield a slightly colored oily product having a boiling point of 115° C. at 0.4 millimeter of mercury ($n_D^{30}$ 1.4931). The yield was 76.2 percent of the theoretical and analysis showed nitrogen found=8.27 percent (calculated 7.73 percent).

The efficacy of this invention is illustrated by the following tests in which compounds representative of those contemplated for use herein were evaluated as herbicides. The representative compounds were those prepared as above and designated as follows:

COMPOUND 1.—3-CYCLOHEXENYLMETHYL
N-METHYLCARBAMATE

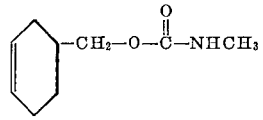

COMPOUND 2.—1-(3-CYCLOHEXENYL)PROPYNYL
N-METHYLCARBAMATE

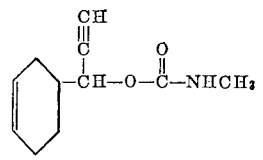

Suspensions of the test compounds were prepared by dissolving one gram of compound in 50 milliliters of acetone in which had been dissolved 0.1 gram (10 percent of the weight of compound) of an alkylphenoxy polyethoxyethanol surfactant, as an emulsifying or dispersing agent. The resulting solution or suspension was mixed into 150 milliliters of water to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water.

In one series of tests, Compounds 1 and 2 were evaluated with regard to their pre-emergence herbicidal activity, i.e. their ability to inhibit seed germination or to kill seedlings at an early stage of growth.

Two seed-soil mixtures were prepared, the first by mixing 53 cubic centimeters of perennial ryegrass seed (*Lolium perenne*) and 27 cubic centimeters of Florida broadleaf mustard seed (*Brassica pincea* var. *foliosa*) with 6100 cubic centimeters of sifted, fairly dry soil, the second by mixing 31 cubic centimeters of golden millet seeds (*Setaria italica* var. *stramineofructa*) and 12 cubic centimeters of redroot seeds (*Amaranthus retroflexus*) with 6100 cubic centimeters of sifted, fairly dry soil. Each of the said two mixtures was rolled separately on a ball mill for about one-half hour ot insure uniform mixing of seed and soil, and, for each chemical to be tested, a three-inch pot was filled with each of the mixtures, and the pots removed to the greenhouse and watered lightly.

About two hours after such planting, 25 milliliters of test solution obtained by diluting the afore-described stock suspension to 1000 parts per million with water was added to each of two pots containing the two separate mixtures. A control test, carried out as above but without addition of test compound, was also performed. The pots were held in the greenhouse and watered lightly for three weeks, at which time observations were made as to the extent of injury of each plant species and each test compound was rated according to the following designations.

5=no seedlings emerged (or those did emerge subsequently died in the early seedling stage)
4=fed seedlings emerged
3=moderate reduction in stand
2=slight reduction in stand
1=no injury; seedlings appear no different with respect stand or growth than control The results of these tests are set forth in Table I.

*Table I*

| Compound | Seed phytotoxicity rating | | | |
|---|---|---|---|---|
| | Rye | Millet | Redroot | Mustard |
| Compound 1 | 3 | 5 | 4 | 4 |
| Compound 2 | 4 | 3 | 5 | 5 |

An interesting aspect of this invention resides in the fact that the materials used herein are able to kill weeds selectively to the extent that certain crops such as peanut are left uneffected. In one series of tests, Compound 1 was applied to soil seeded with peanut and crabgrass, barnyard grass, and yellow foxtail, at a rate corresponding to 20 pounds per acre. Observations made two weeks after application showed that the weeds were completely controlled while the peanuts exhibited only very slight or no phytotoxic effects.

What is claimed is:
1. A method of inhibiting the growth of vegetation which comprises applying thereto, in phytotoxic amounts, a cyclohexenyl N-methylcarbamate of the formula

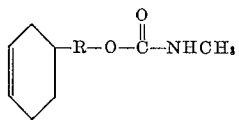

wherein R is a divalent organic linkage selected from the group consisting of substituted and unsubstituted alkylene and alkenylene wherein the substituent is selected from the group consisting of alkyl, alkenyl, and alkynyl and where R contains from 1 to 5 carbon atoms.

2. A method of inhibiting the growth of vegetation which comprises applying thereto, in phytotoxic amounts, 3-cyclohexenyl methyl N-methylcarbamate.

3. A method of inhibiting the growth of vegetation which comprises applying thereto, in phytotoxic amounts, 1-(3-cyclohexenyl)propynyl N-methylcarbamate.

4. A method of killing weeds which comprises applying thereto, in effective amounts, a cyclohexenyl N-methylcarbamate of the formula

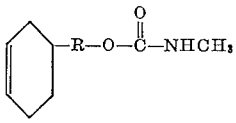

wherein R is a divalent organic linkage selected from the group consisting of substituted and unsubstituted alkylene and alkenylene wherein the substituent is selected from the group consisting of alkyl, alkenyl, and alkynyl and where R contains from 1 to 5 carbon atoms.

5. A method of killing weeds which comprises applying thereto, in effective amounts, 3-cyclohexenylmethyl N-methylcarbamate.

6. A method of killing weeds which comprises applying thereto, in effective amounts, 1-(3-cyclohexenyl)propynyl N-methylcarbamate.

References Cited by the Examiner
UNITED STATES PATENTS
2,776,196  1/1957  Gysin et al. _____ 71—2.6
3,046,302  7/1962  Oja _____ 71—2.3
3,078,273  2/1963  Harman et al. _____ 71—2.6

OTHER REFERENCES
Moore et al.: Agricultural and Food Chemistry, vol. 2, No. 7, pages 356–362 (pages 358, 359, 360 and 362 particuarly relied upon), 1957.

LEWIS GOTTS, *Primary Examiner.*